United States Patent
Jefferson et al.

[15] 3,672,576

[45] June 27, 1972

[54] BUTCHER'S PNEUMATIC BONE DUST VACUUM CLEANER

[72] Inventors: Leo J. Jefferson; Lenard J. Crosby, both of Hollywood, Fla.

[73] Assignees: Lenard J. Crosby; Harold E. Cook, Hollywood, Fla. part interest to each

[22] Filed: April 14, 1970

[21] Appl. No.: 28,385

[52] U.S. Cl. ........................... 239/521, 239/567, 239/568
[51] Int. Cl. ................................................. B05b 1/26
[58] Field of Search ........................ 239/568, 521, 530, 567

[56] References Cited

UNITED STATES PATENTS

| | | | |
|---|---|---|---|
| 2,692,163 | 10/1954 | Geel | 239/521 |
| 782,680 | 2/1905 | Millspaugh | 239/521 X |
| 2,115,442 | 4/1938 | Emery | 239/568 X |
| 2,516,282 | 7/1950 | Wilfon | 239/DIG. 18 |
| 3,022,016 | 2/1962 | Shrewsbury | 239/521 |
| 3,099,696 | 7/1963 | Meek | 239/521 |

*Primary Examiner*—Lloyd L. King
*Attorney*—Gustave Miller

[57] ABSTRACT

This cleaner is a device for use by a butcher for vacuum cleaning bone dust off the surface of the meat and bone after he has used a saw to cut through the bone in the meat. It utilizes a vacuum created by pneumatic pressure from a conventional pneumatic pressure hose connected to any suitable source of pressure, the hose being provided with a conventional pressure control valve. The cleaner is connected to the pressure hose by a conventional detachable coupling. The cleaner consists of a somewhat flattened tube, more or less oval in cross-section, and has one end open for attachment to the pressure hose, and its other end is closed. A rigid skirt, substantially the length of the oval portion of the tube, is secured longitudinally along one shorter side of the oval tube, and a series of spaced apart, elongated slits are provided in the tube closely adjacent and beneath the skirt, so that air pressure passing therethrough provides jets of air parallel to and closely beneath the skirt, the slits being located so as to be an extension of approximately the maximum diameter of the oval tube. The cleaner is passed closely over the surface of the cut meat and bone, and the pressure jets create a vacuum on the meat surface thus pulling up the bone dust from the meat surface into the jet stream and blowing it parallel to the bottom of the skirt. A dust receptacle, preferably with an overhanging lip extending over the meat block on which the meat is located, serves to receive the dust as the cleaner is swept over the meat surface and meat block surface picking up and blowing the dust into the dust receptacle.

4 Claims, 4 Drawing Figures

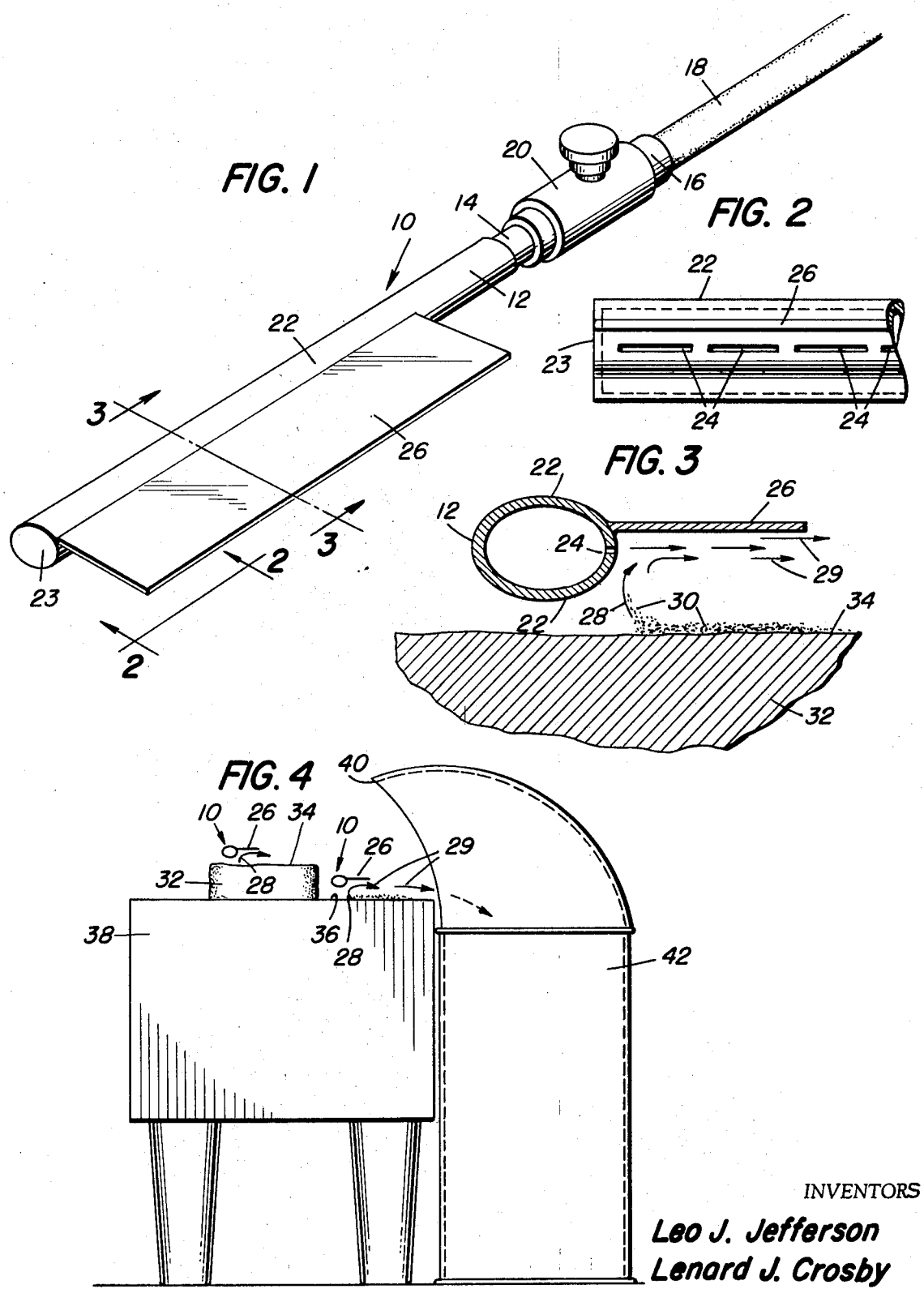

BUTCHER'S PNEUMATIC BONE DUST VACUUM CLEANER

OBJECTS OF THE INVENTION

It is an object of this invention to provide a simple cleaner and process for use by a butcher for cleaning bone dust off the surface of the cut meat after the bone and meat were sawed.

A further object of this invention is to provide a simple, comparatively inexpensive vacuum cleaner attachment for a conventional pneumatic pressure hose having a pressure control valve at the end of the pneumatic hose to which the cleaner is coupled.

A further object of this invention is to use a pneumatic pressure jet stream directed over and parallel to the cut meat surface to create a vacuum at the surface to draw the dust up into the pressure jet stream and carry it to a dust receptacle.

A further object of this invention is to provide a bone dust cleaner in the form of a tube, oval shaped in cross-section, open at one end with a coupling for attaching it to a pneumatic pressure hose, closed at its other end, with an elongate series of elongate slits parallel to a maximum diameter of the oval tube and extending through a short side of the oval tube beneath a rigid skirt extending from the tube closely adjacent the series of slits and parallel to the jet stream therethrough.

Yet a further object of this invention is to provide a cleaner made of readily sanitized material, such as stainless steel or rigid high impact plastic.

BRIEF DESCRIPTION OF THE FIGURES

With the above and related objects in view, this invention consists in the details of construction and combination of parts, as will be more fully understood from the following description, when read in conjunction with the accompanying drawing, in which:

FIG. 1 is a perspective view of the cleaner of this invention coupled with a conventional pneumatic hose ready for use.

FIG. 2 is an enlarged fragmentary section on line 2—2 of FIG. 1.

FIG. 3 is an enlarged detailed fragmentary section on line 3—3 of FIG. 1, showing the cleaner passing over a cut meat surface.

FIG. 4 is a side elevational view of the cleaner in operation.

DETAILED DESCRIPTION OF THE INVENTION

There is shown at 10 the cleaner of this invention in the form of a tube 12 having an open end 14 shaped to be coupled in a conventional manner to an end 16 of a pneumatic pressure hose 18 provided with a control valve 20 at its end. The hose 18 will be connected to a suitable air pressure supply of 80 to 120 pounds per square inch. Beyond its open coupling end 14, the tube 12 is flattened to a somewhat oval shape 22 and then it is sealed at its other end 23.

An elongate series of elongate slits 24, each approximately one-fourth inch by one-hundredth inch wide extends along one short side of the oval tube extending at approximately the maximum diameter of the oval of the oval tube 22. Secured to the oval tube 22 parallel to the same maximum diameter and closely adjacent and above the series of slits 24 is a rigid wide skirt or blade 26. When the pressure jets are emitted from the slits 24, the jets of air travel parallel to the bottom surface of the skirt 26, and thus create a vacuum 28 below the jet stream 29.

OPERATION OF THE INVENTION

In operation, the oval shaped cleaner tube 22, as described, is coupled with the valved coupling end 16 of the pneumatic hose 18, and the butcher may readily clean the bone dust 30 created by the act of sawing the bone in a piece of meat 32, as with a hand or power saw. To do so, he merely operates the pneumatic valve 20 while passing the cleaner 10 over the cut top surface 34 of the meat 32, and then over the top 36 of the butcher block 38, sucking up the bone dust 30 from the meat surface 34 and then from the butcher block surface 36 and carrying it under the dust receptacle overhanging lip 40 and depositing it in the dust receptacle 42.

The rigid skirt 26 adjacent the jet stream 29 from the slits 24 intensifies and concentrates the vacuum 28 created at the meat surface 34, and thus more effectively cleans up even that dust 30 which may have been embedded in the meat surface 34 by the sawing action, and keeps the dust 30 moving forward to be deposited in the dust receptacle 40.

ABSTRACT OF DRAWING

In the drawings, like numbers refer to like parts, and for the purposes of explication, set forth below are the numbered parts of the improved Butcher's Pneumatic Bone Dust Cleaner:

10 cleaner of this invention
12 tube
14 open coupling end of 12
16 coupling end of hose 18
18 pneumatic hose
20 control valve on 18
22 oval or flattened tube portion
23 closed end of 22
24 elongate series of elongate slits
26 skirt or blade
28 vacuum arrows
29 jet stream arrows
30 bone dust
32 piece of meat
34 cut top surface of meat 32
36 top of butcher block 38
38 butcher block
40 overhanging lip of 42
42 dust receptacle Although this invention has been described in considerable detail, such description is intended as being illustrative rather than limiting, since the invention may be variously embodied and the scope of the invention is to be determined as claimed.

Having thus set forth and disclosed the nature of this invention, what is claimed is:

1. A bone dust vacuum cleaner (10) for sawed bone and meat surfaces (34) comprising an elongate tube (12) closed at one end (23) and coupling means (14) complementary to coupling means (16) of a valved (20) pneumatic pressure hose (18) for receiving manually controllable pneumatic pressure therefrom, said tube (12) having aperture means (24) extending longitudinally thereof, and a rigid flat skirt (26) extending longitudinally of said tube (12) closely adjacent and parallel to a pneumatic jet pressure stream (29) emitted from said aperture means (24), said flat skirt (26) concentrating the vacuum (28) below said skirt (26), preventing any vacuum being wasted above said skirt (26) and thus sucking the dust (30) into said jet pressure stream (29) for disposal elsewhere (42).

2. The cleaner of claim 1, said tube (12) being somewhat flattened (22) above and below said skirt (26).

3. The cleaner of claim 1, said aperture means being an elongate series of elongate slits (24).

4. The cleaner of claim 2, said skirt (26) being flattened to approximately an oval (22) in cross-section, said aperture means being an elongate series of elongate slits (24) extending at approximately the maximum diameter of said oval shaped tube (22).

* * * * *